(12) United States Patent
Seppmann

(10) Patent No.: US 7,617,835 B2
(45) Date of Patent: Nov. 17, 2009

(54) HYDRANT ASSIST KIT

(75) Inventor: Corey J. Seppmann, Mankato, MN (US)

(73) Assignee: Seppmann Enterprises, LLC, Mankato, MN (US)

( * ) Notice: Subject to any disclaimer, the term of this patent is extended or adjusted under 35 U.S.C. 154(b) by 0 days.

(21) Appl. No.: 11/518,713

(22) Filed: Sep. 11, 2006

(65) Prior Publication Data

US 2007/0056631 A1 Mar. 15, 2007

Related U.S. Application Data

(60) Provisional application No. 60/715,125, filed on Sep. 9, 2005.

(51) Int. Cl.
*E03B 9/02* (2006.01)

(52) U.S. Cl. .............. 137/15.08; 137/294; 137/296; 137/301; 251/366

(58) Field of Classification Search ............. 137/294, 137/301, 272, 15.08; 285/305; 251/366
See application file for complete search history.

(56) References Cited

U.S. PATENT DOCUMENTS

| | | | | |
|---|---|---|---|---|
| 1,385,572 | A * | 7/1921 | Murdock | 137/301 |
| 3,070,116 | A * | 12/1962 | Noland et at | 137/302 |
| 4,483,361 | A * | 11/1984 | Jungbert, Sr. | 137/301 |
| 4,923,350 | A * | 5/1990 | Hinksman et al. | 285/305 |
| 6,427,716 | B1 * | 8/2002 | Hoeptner, III | 137/301 |
| 6,684,900 | B1 | 2/2004 | McKeague | |
| 7,249,609 | B2 * | 7/2007 | Ball | 137/301 |

* cited by examiner

*Primary Examiner*—Kevin L Lee
(74) *Attorney, Agent, or Firm*—Leffert Jay & Polglaze, P.A.

(57) ABSTRACT

A coupler for a hydrant assist kit includes a single piece construction having an inlet, an outlet, a basin, and a drain, the drain above the inlet and at a bottom of the basin. A hydrant assist kit connects a water line to a hydrant with the coupler and a sleeve attached to the coupler to protect the hydrant pipe.

14 Claims, 4 Drawing Sheets

HYDRANT ASSIST KIT

RELATED APPLICATION

This application claims the benefit of U.S. Provisional Application No. 60/715,125, filed on Sep. 9, 2005, which is hereby incorporated herein in its entirety by reference.

FIELD

The present invention relates generally to yard hydrants and in particular the present invention relates to connection of hydrants to water lines.

BACKGROUND

Yard hydrants are used in many environments to provide an outdoor water source, especially in farm or other rural locations, gardens, and the like. Yard hydrants are typically supplied with water from a water line buried below the front line, and have a long standpipe that is connected to the water line. When a hydrant is attached to a buried water line, which may be as deep as four feet or more in very cold areas, replacement of a hydrant that breaks or otherwise becomes unusable is a difficult and expensive process, requiring an excavation of the area around the hydrant.

One proposed solution to at least some of the problems facing replacement of broken water hydrants involves the use of an adapter that removably couples the hydrant to a buried water line. Such an adapter is shown in U.S. Pat. No. 6,684,900. However, the adapter of that design has a number of problems. First, it uses a multiple piece construction, with a nipple outlet screwed into the adapter, for connection to a water hydrant pipe. This two piece construction weakens the overall adapter, which can be subjected to large amounts of force on attempted removal of the hydrant later. Further, the adapter of the '900 patent has a small drain hole for drainage of excess water from the adapter. This drain hole is situated above the bottom of the adapter, so standing water can accumulate in the adapter. Still further, the adapter inlet pipe is askew from the drain. This configuration is easily plugged by debris, creating a situation where the adapter cannot be drained.

For the reasons stated above, and for other reasons stated below which will become apparent to those skilled in the art upon reading and understanding the present specification, there is a need in the art for an improved process for connecting and replacing hydrants.

SUMMARY

The above-mentioned problems and other problems are addressed by the present invention and will be understood by reading and studying the following specification.

In one embodiment, a hydrant assist kit attaches a water hydrant to an underground waterline. Once installed the hydrant assist kit embodiments allow the hydrant to be replaced without any digging or excavating. A new hydrant threads directly into a bottom coupler which is attached to the underground waterline. The hydrant or waterline is encased in plastic or steel pipe. The cap is amenable to use with a heat tape system.

Other embodiments are described and claimed.

DETAILED DESCRIPTION

Figure 1:
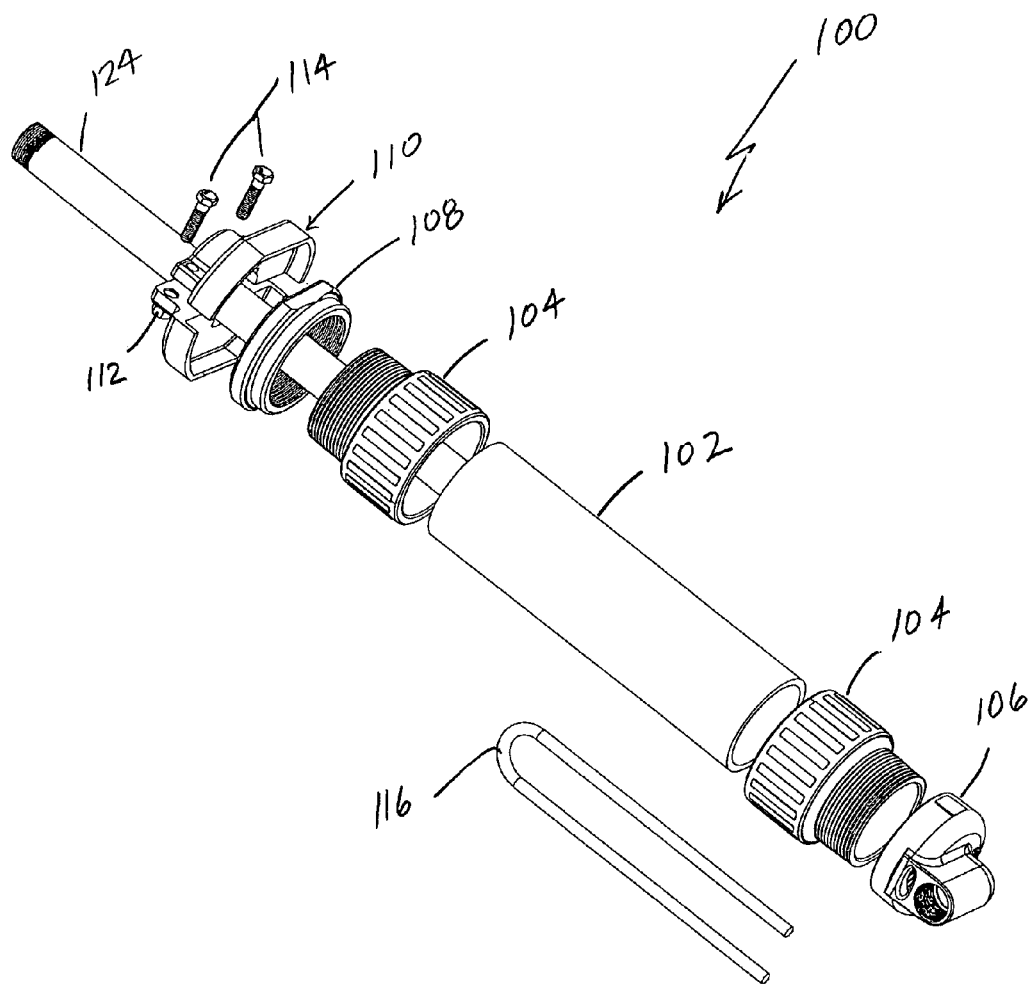
FIG. 1 is a partially exploded view of a hydrant assist kit according to one embodiment.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

As shown in FIG. 1, a partially exploded view of a hydrant assist kit 100 is shown. hydrant assist kit 100 comprises in one embodiment a sleeve pipe 102, a pair of connectors or adapters 104, a coupler 106, and a top cap. In one embodiment, the top cap includes a top nut 108, a locking cap 110, a locking nut and bolt 112 and 114, and a securing staple 116. Alternatively, other top caps for sealing the top of the sleeve 102 are amenable to use with the hydrant assist kit. One such top is a well seal. Well seals typically have two pieces, are typically made of PVC, and secure the top of the sleeve with bolts. Such well seals are known in the art and are not described further herein.

Since many hydrant installers and maintenance workers already have supplies of PVC pipe and appropriate caps for the PVC pipe, in other embodiments, the sleeve pipe 102 and connectors 104 are provided separately by a user. Further, the sizes of sleeves and connectors such as sleeve 102 and connectors 104 can be varied to accommodate different size hydrants and pipes, by using a PVC coupling to change size between the coupler 106 and the sleeve 102.

Figure 2A:
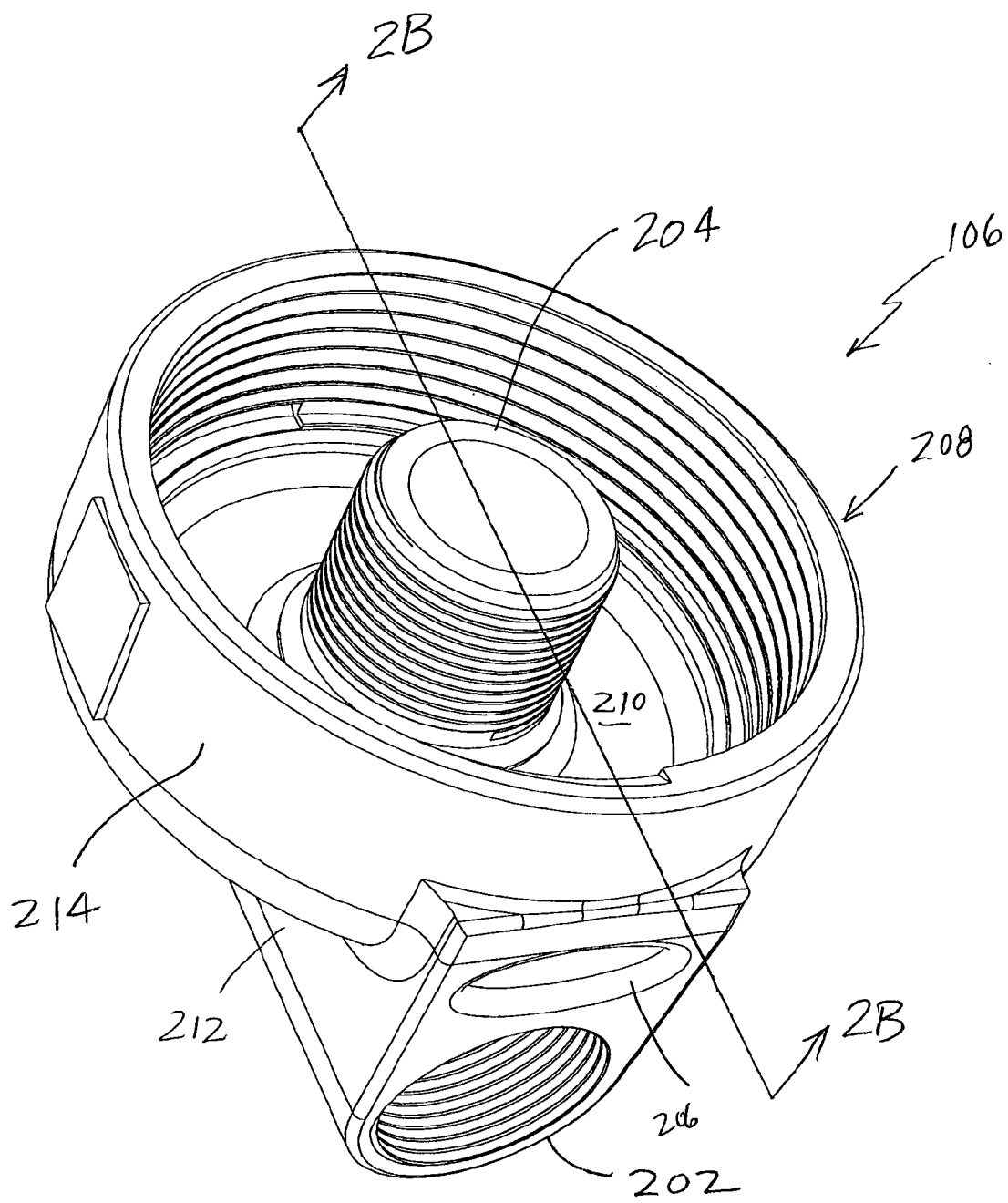
FIG. 2A is an isometric view of a coupler according to another embodiment.
Figure 2B:
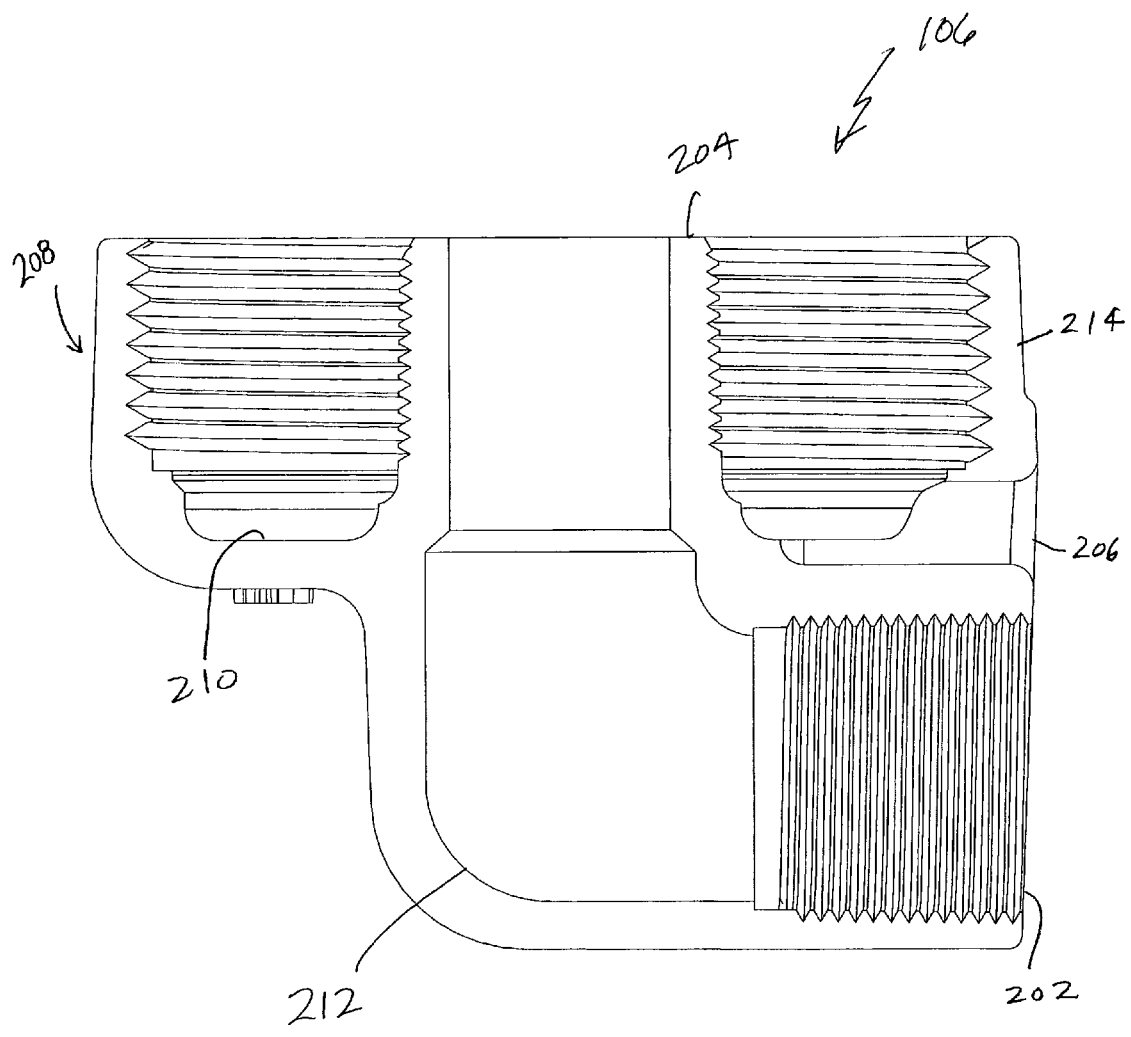
FIG. 2B is a cross-sectional view along lines 2B-2B of FIG. 2A.

Coupler 106 is shown in greater detail in FIGS. 2A and 2B, which are respectively, an isometric view in FIG. 2A and a cross-sectional view in FIG. 2B taken along lines 2B-2B of FIG. 2A. Coupler 106 has a single piece construction having a water pipe inlet 202 for connecting to a water pipe, hydrant outlet 204 for connecting to a hydrant pipe, and a drain 206 positioned substantially directly above the inlet 202. The coupler 106 has a basin 208 having a base or basin 210 and side walls 214. The side walls are in one embodiment threaded for attachment of a sleeve such as sleeve 102 via a connector 104 to the coupler 106. The drain 206 is positioned having an outlet lower than the base 210, so that any excess water in the basin 208 drains from the basin through a gravity drain process. The nipple of outlet 204 is stronger than traditional screw-in nipples, and does not suffer from a potential of removal when unscrewing an attached pipe.

The coupler drain 206 is positioned substantially above the inlet pipe so that if or when the hydrant sleeve 102 and the coupler 106 settle into the ground, for whatever reason, the inlet 202 below the drain 206 keeps the drain 206 open and allows water in the basin 210 to drain. The drain 206 size in one embodiment is much larger than conventional drains to allow for the opening up of an unlikely plug with the use of fish tape or a vacuum, which is very difficult with small drains. The drain 206 opening is at the lowest level of the coupler basin 210 where water could collect. Because of that, all of the water in the basin 210 can drain out of the coupler 106, avoiding standing water issues.

The outlet 204 is connected to the inlet 202 by an elbow 212. In one embodiment, elbow 212 tapers from a larger diameter at inlet 202 to a narrower diameter at outlet 204 to provide increased water pressure and flow to the hydrant.

Figure 3:
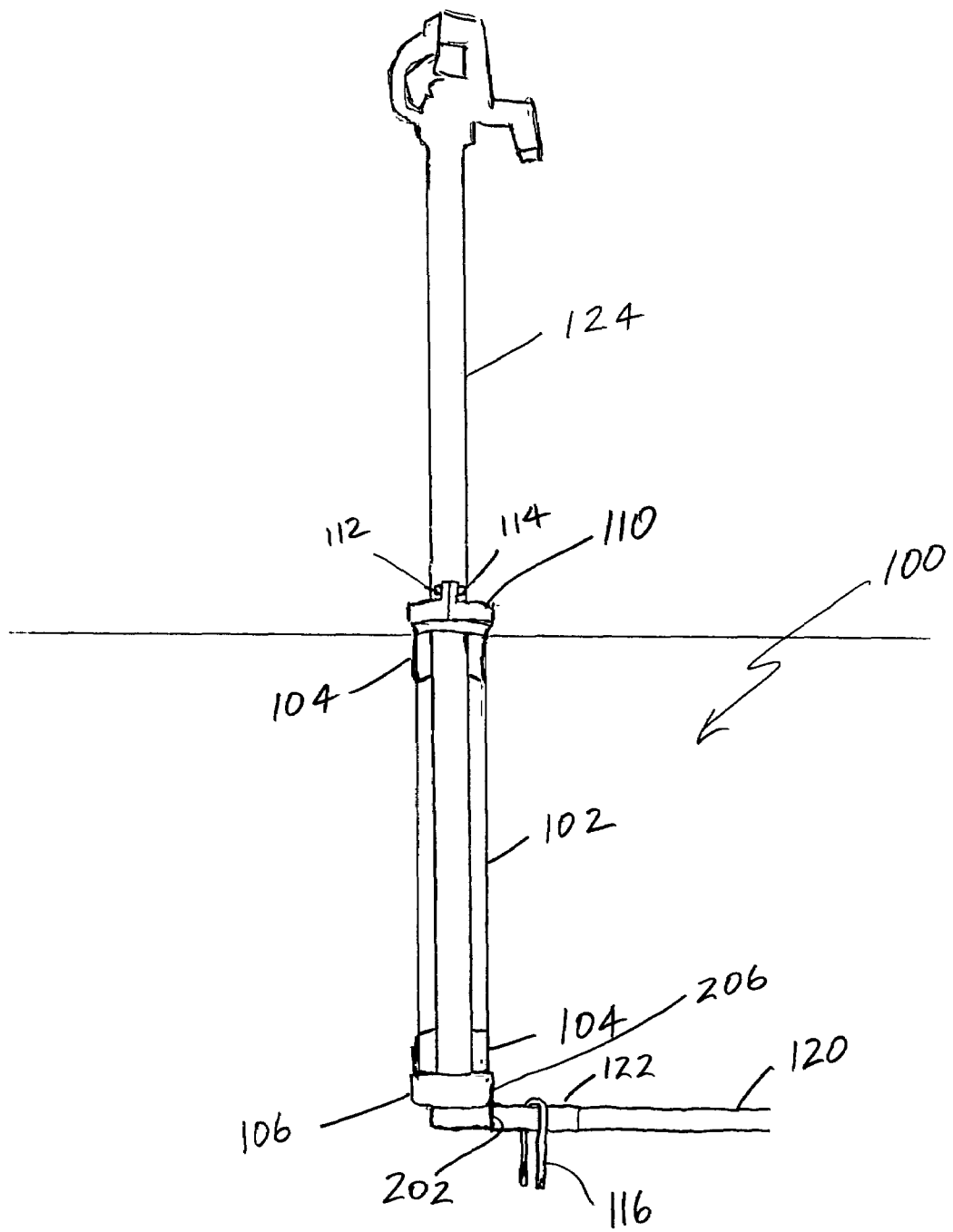
FIG. 3 is an elevation view of an installation of a hydrant assist kit according to another embodiment.

The components are assembled to form a hydrant assist kit shown in installed position in FIG. 3. As can be seen from FIGS. 1 and 3, the hydrant assist kit 100 assembles as follows. The coupler 106 is attached to a buried waterline 120, in one embodiment using a nipple 122 of brass or another condition-tolerant material. The staple 116 is secured over the nipple 122, not the water line 120, in order to avoid damage to the water line. The staple 116 secures the couple from rotation when a hydrant such as hydrant 124 is later installed to the coupler. The sleeve pipe 102 is connected to the coupler 106 with a connector 104. A second connector 104 connects the sleeve pipe 102 to the top nut 108, and locking cap 110 is secured to top nut 108 using fasteners such as nut and bolt 112 and 114. The locking cap 110 is in one embodiment a two piece locking cap having its pieces connected using suitable fasteners such as cap nut and bolt 112 and 114. The water line 120 leads from a water source 126 to a spot where a hydrant such as hydrant 124 is to be installed. The waterline 120 is buried as described above.

The coupler 106 has in one embodiment an internal flow port to enhance water flow in and through the coupler. The drain back port in the coupler is much larger than conventional yard hydrant drain ports, in one embodiment 15-25 times larger. An optional jetting plate allows jetting to be performed without obstruction.

The hydrant assist kit provides quick access for repairs on site, provides a cleanable unit having a drain back plate that can be jetted and re-opened in the event of a plug up.

The various embodiments of the hydrant assist kit and coupler are adaptable to fit nearly any size waterline. Further, in very cold conditions it is common to use super insulated pipe and/or heat tape. The present embodiments are amenable to use with super insulated pipe and heat tape, such as Frost-Tex or Easyheat heat tape systems.

CONCLUSION

A hydrant assist kit and a coupler for connecting a hydrant to a buried water line have been described that include a drain directly above an inlet, and a single piece coupler construction that is stronger than previous adapters.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A coupler to connect a buried water line and a yard hydrant, comprising:
    a single-piece construction having a body with a basin and side walls;
    an inlet below the basin adapted to connect to a water line;
    an outlet extending from the basin and connected to the inlet, the outlet adapted to connect to a yard hydrant; and
    a drain positioned substantially directly above the inlet at the bottom of the basin.

2. The coupler of claim 1, wherein the inlet and the outlet are connected by a tapered elbow having a larger diameter at the inlet and a smaller diameter at the outlet.

3. The coupler of claim 1, wherein the coupler is brass.

4. The coupler of claim 1, wherein the side walls are threaded for connection to an external sleeve.

5. The coupler of claim 1, wherein the outlet is externally threaded for connection to an external hydrant.

6. The coupler of claim 1, wherein the drain is sized to allow passage of a fish tape therethrough.

7. The coupler of claim 1, wherein the drain is sized to be approximately 15-25 times a size of a standard drain.

8. A assist kit for mounting a hydrant to a buried water line, comprising:
    a coupler adapted to connect to the hydrant and the water line;
    a sleeve connected to the coupler and surrounding a pipe of the hydrant; and
    a cap connected to a top of the sleeve;
    wherein the coupler comprises:
        a single-piece construction having a body with a basin and side walls;
        an inlet below the basin adapted to connect to a water line;
        an outlet extending from the basin and connected to the inlet, the outlet adapted to connect to a yard hydrant; and
        a drain positioned substantially directly above the inlet at the bottom of the basin.

9. The assist kit of claim 8, and further comprising:
    a staple to secure the coupler from twisting.

10. The assist kit of claim 8, wherein the cap further comprises:
    a top nut connected to the top of the sleeve; and
    a two-piece cap secured to the top nut by fasteners.

11. The assist kit of claim 8, wherein the cap further comprises:
    a well seal having two pieces secured to the sleeve by fasteners.

12. A method of installing a hydrant assist kit, comprising:
    attaching a bottom of a sleeve to a single piece coupler with a connector;
    connecting an inlet of the coupler to a water line with a nipple, the inlet positioned substantially directly beneath a drain of the coupler;
    securing the coupler from rotation with a staple;
    attaching a hydrant to an outlet of the coupler, the outlet positioned within the sleeve and having a diameter smaller than a diameter of the inlet; and
    attaching a top of the sleeve to a cap with a connector and a top nut.

13. The method of claim 12, wherein securing the coupler from rotation comprises placing the staple over the nipple into surrounding material.

14. The method of claim 12, wherein attaching a top of the sleeve to a cap comprises attaching a two-piece cap to the locking nut.

* * * * *